(12) United States Patent
Madathil

(10) Patent No.: US 11,227,753 B2
(45) Date of Patent: Jan. 18, 2022

(54) SYSTEM AND METHOD FOR ACCURATELY QUANTIFYING COMPOSITION OF A TARGET SAMPLE

(71) Applicant: ATONARP INC., Tokyo (JP)

(72) Inventor: Karthikeyan Rajan Madathil, Karnataka (IN)

(73) Assignee: ATONARP INC., Tokyo (JP)

( * ) Notice: Subject to any disclaimer, the term of this patent is extended or adjusted under 35 U.S.C. 154(b) by 308 days.

(21) Appl. No.: 16/337,126

(22) PCT Filed: Oct. 4, 2017

(86) PCT No.: PCT/JP2017/036086
§ 371 (c)(1),
(2) Date: Mar. 27, 2019

(87) PCT Pub. No.: WO2018/066587
PCT Pub. Date: Apr. 12, 2018

(65) Prior Publication Data
US 2019/0221412 A1      Jul. 18, 2019

(30) Foreign Application Priority Data

Oct. 4, 2016 (IN) .............................. 201641033970

(51) Int. Cl.
*H01J 49/00* (2006.01)
*G06N 20/00* (2019.01)
(Continued)

(52) U.S. Cl.
CPC ........ *H01J 49/0036* (2013.01); *G06F 16/901* (2019.01); *G06N 20/00* (2019.01); *G01N 27/62* (2013.01)

(58) Field of Classification Search
CPC ...... G01N 27/62; G06F 16/901; G06N 20/00; H01J 49/0036
See application file for complete search history.

(56) References Cited

U.S. PATENT DOCUMENTS

| | | |
|---|---|---|
| 5,247,175 A | 9/1993 | Schoen et al. |
| 9,666,422 B2 | 5/2017 | Murthy |
| | (Continued) | |

FOREIGN PATENT DOCUMENTS

| | | |
|---|---|---|
| WO | 2004097581 A2 | 11/2004 |
| WO | 2004102180 A2 | 11/2004 |
| | (Continued) | |

OTHER PUBLICATIONS

Extended European Search Report issued in corresponding European Patent Application No. 17858424.9, dated May 7, 2020 (8 pages).

(Continued)

*Primary Examiner* — Roy Y Yi
*Assistant Examiner* — Geoffrey T Evans
(74) *Attorney, Agent, or Firm* — Buchanan Ingersoll & Rooney PC

(57) ABSTRACT

System for quantifying a composition of a target sample based on a scan output of a first type of sensor includes a reference database, a custom database and a set of modules. The set of modules includes an analytical model creation module that creates an analytical model of the first type of sensor, a sample processing module that processes samples that include accurately known compositions using the first type of sensor under a standard pressure condition, a molecular fraction estimation module that estimates molecular fraction of the samples using an estimation method and the analytical model, an analytical model optimization module that optimizes the analytical model by comparing the molecular fraction of the samples with a pre-determined molecular fraction of the samples, and a target composition estimation module that estimates a composition of the target sample based on the scan output using the estimation method with the optimized analytical model.

22 Claims, 8 Drawing Sheets

(51) Int. Cl.
    *G01N 27/62*    (2021.01)
    *G06F 16/901*   (2019.01)

(56) References Cited

U.S. PATENT DOCUMENTS

| | | |
|---|---|---|
| 2006/0136158 A1 | 6/2006 | Goldberg et al. |
| 2012/0112056 A1* | 5/2012 | Brucker .............. H01J 49/4245 |
| | | 250/282 |
| 2012/0164741 A1 | 6/2012 | Chen et al. |
| 2014/0156202 A1 | 6/2014 | Floridia et al. |
| 2015/0074093 A1* | 3/2015 | Murthy ............. G06F 16/24578 |
| | | 707/723 |
| 2016/0011101 A1* | 1/2016 | Ognibene ............... G01N 21/39 |
| | | 356/437 |

FOREIGN PATENT DOCUMENTS

| | | |
|---|---|---|
| WO | 2006050226 A2 | 5/2006 |
| WO | 2013171313 A1 | 11/2013 |
| WO | 2014125819 A1 | 8/2014 |

OTHER PUBLICATIONS

International Search Report and Written Opinion issued in corresponding International Patent Application No. PCT/ PCT/JP2017/036086, 6 pages (dated Dec. 26, 2017).

\* cited by examiner

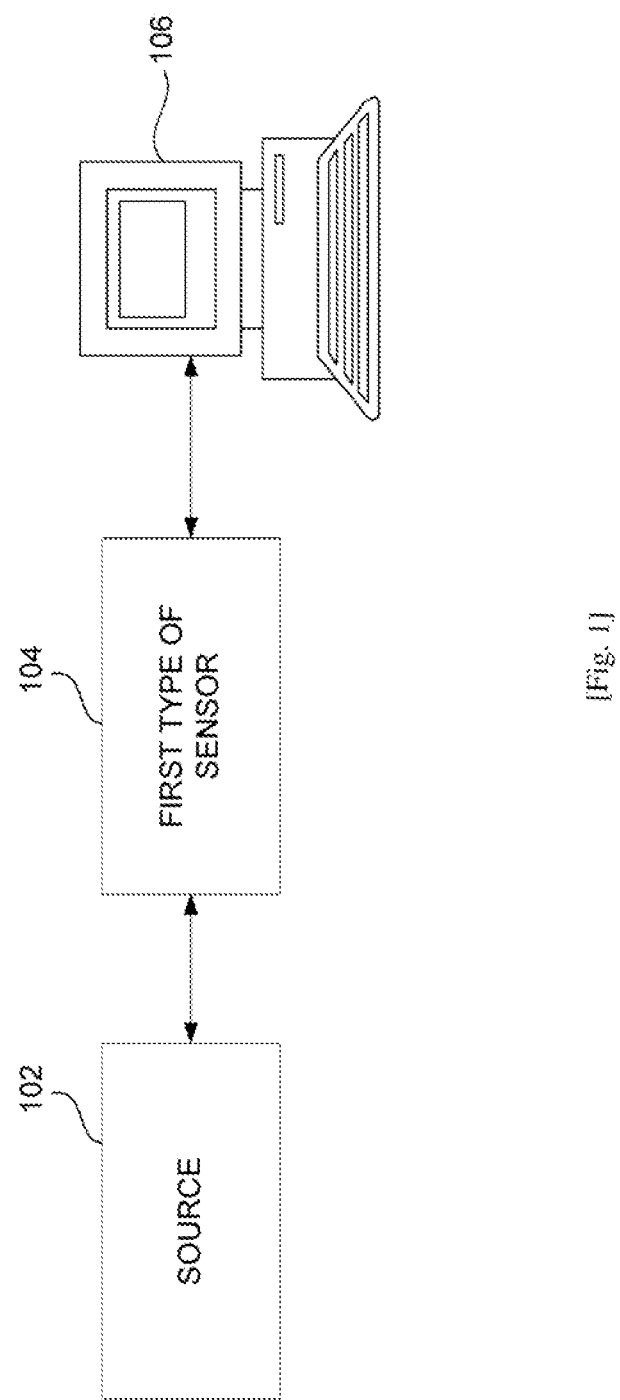
[Fig. 1]

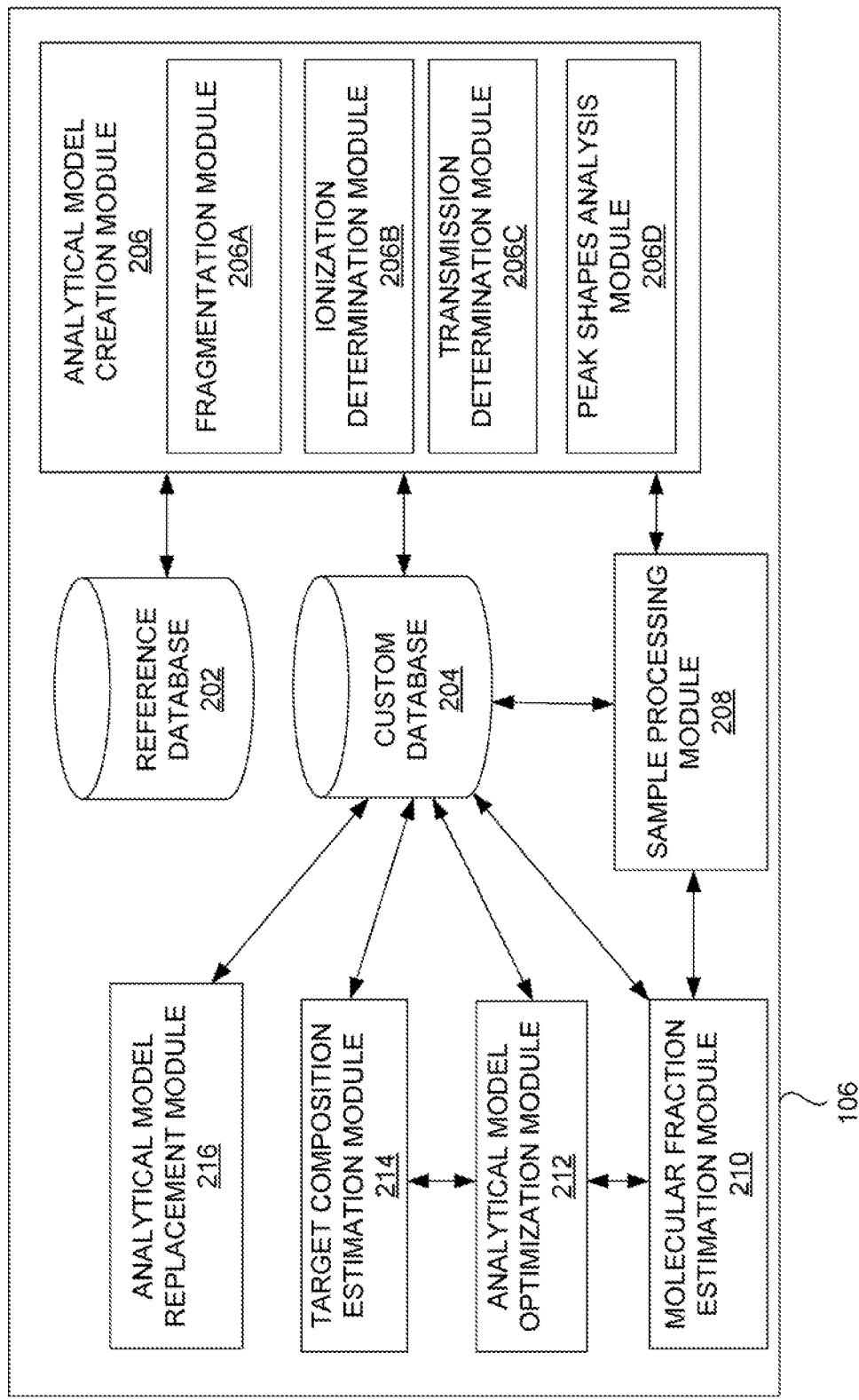
[Fig. 2]

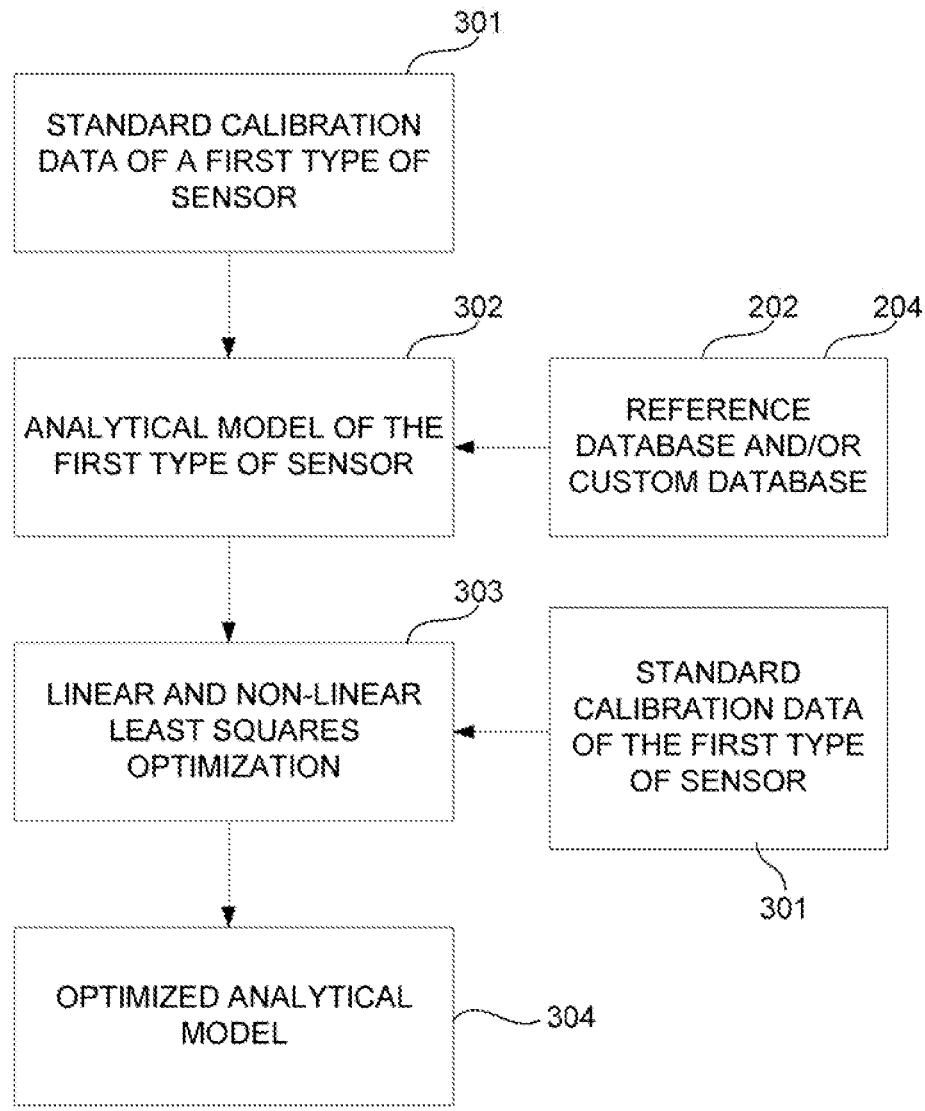
[Fig. 3]

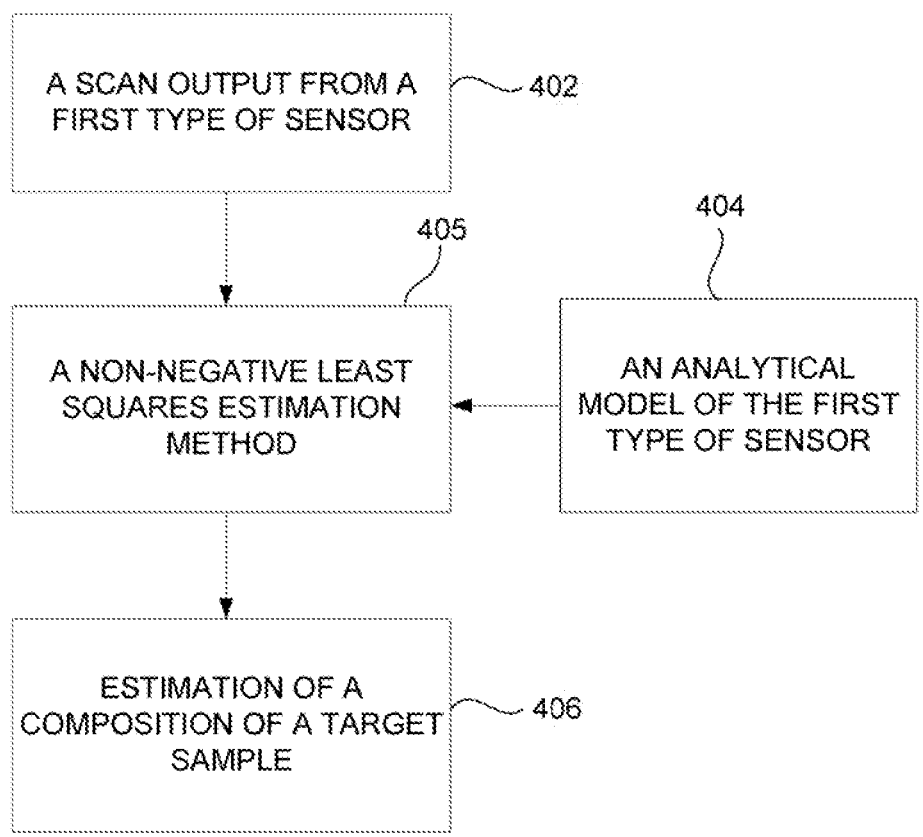
[Fig. 4]

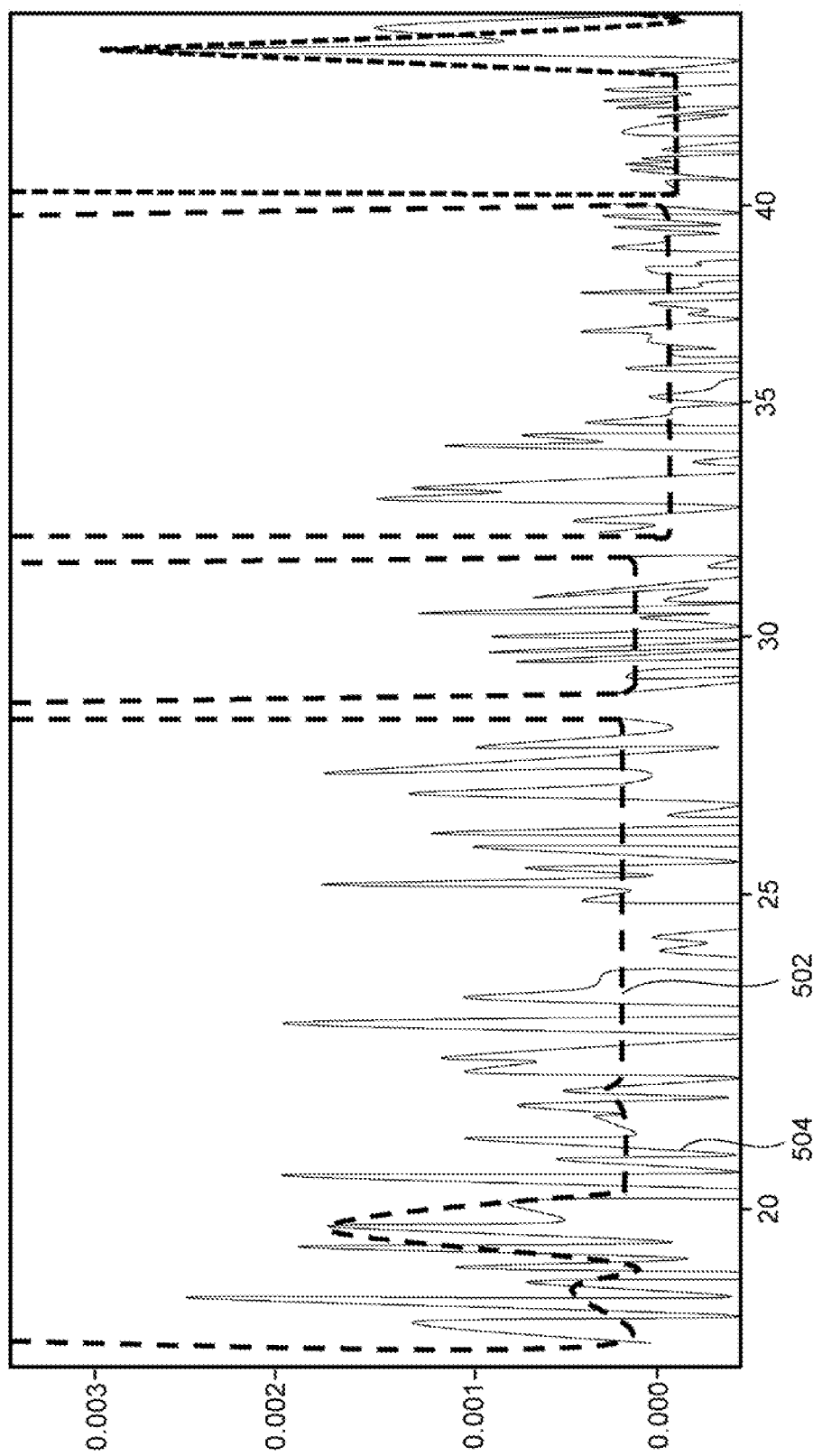
[Fig. 5]

```
┌─────────────────────────────────────────────┐
│ CREATING, USING AN ANALYTICAL MODEL CREATION│
│ MODULE, AN ANALYTICAL MODEL OF A FIRST TYPE │
│ OF SENSOR USING CALIBRATION DATA OF THE     │
│ FIRST TYPE OF SENSOR AND STANDARD           │
│ REFERENCE DATA                              │
│                   602                       │
└─────────────────────────────────────────────┘
                     │
                     ▼
┌─────────────────────────────────────────────┐
│ PROCESSING, USING A SAMPLE PROCESSING       │
│ MODULE, DIFFERENT SAMPLES THAT INCLUDE      │
│ ACCURATELY KNOWN COMPOSITIONS USING THE     │
│ FIRST TYPE OF SENSOR UNDER A STANDARD       │
│ PRESSURE CONDITION                          │
│                   604                       │
└─────────────────────────────────────────────┘
                     │
                     ▼
┌─────────────────────────────────────────────┐
│ ESTIMATING, USING A MOLECULAR FRACTION      │
│ ESTIMATION MODULE, MOLECULAR FRACTION OF    │
│ THE DIFFERENT SAMPLES USING AN ESTIMATION   │
│ METHOD AND THE ANALYTICAL MODEL OF THE      │
│ FIRST TYPE OF SENSOR                        │
│                   606                       │
└─────────────────────────────────────────────┘
                     │
                     ▼
┌─────────────────────────────────────────────┐
│ OPTIMIZING, USING AN ANALYTICAL MODEL       │
│ OPTIMIZATION MODULE, THE ANALYTICAL MODEL   │
│ OF THE FIRST TYPE OF SENSOR BY COMPARING    │
│ THE MOLECULAR FRACTION OF THE DIFFERENT     │
│ SAMPLES WITH PRE-DETERMINED MOLECULAR       │
│ FRACTION OF THE DIFFERENT SAMPLES USING     │
│ ANY ONE OF (A) LINEAR LEAST SQUARES         │
│ OPTIMIZATION TECHNIQUES, (B) NON-LINEAR     │
│ LEAST SQUARES OPTIMIZATION TECHNIQUE OR     │
│ (C) MACHINE LEARNING TECHNIQUES             │
│                   608                       │
└─────────────────────────────────────────────┘
                     │
                     ▼
┌─────────────────────────────────────────────┐
│ ESTIMATING, USING A TARGET COMPOSITION      │
│ ESTIMATION MODULE, A COMPOSITION OF THE     │
│ TARGET SAMPLE BASED ON A SCAN OUTPUT OF     │
│ THE TARGET SAMPLE OBTAINED FROM THE FIRST   │
│ TYPE OF SENSOR USING THE ESTIMATION METHOD  │
│ WITH THE ANALYTICAL MODEL OF THE FIRST TYPE │
│ OF SENSOR AND AN OPTIMIZATION METHOD        │
│                   610                       │
└─────────────────────────────────────────────┘
```

[Fig. 6]

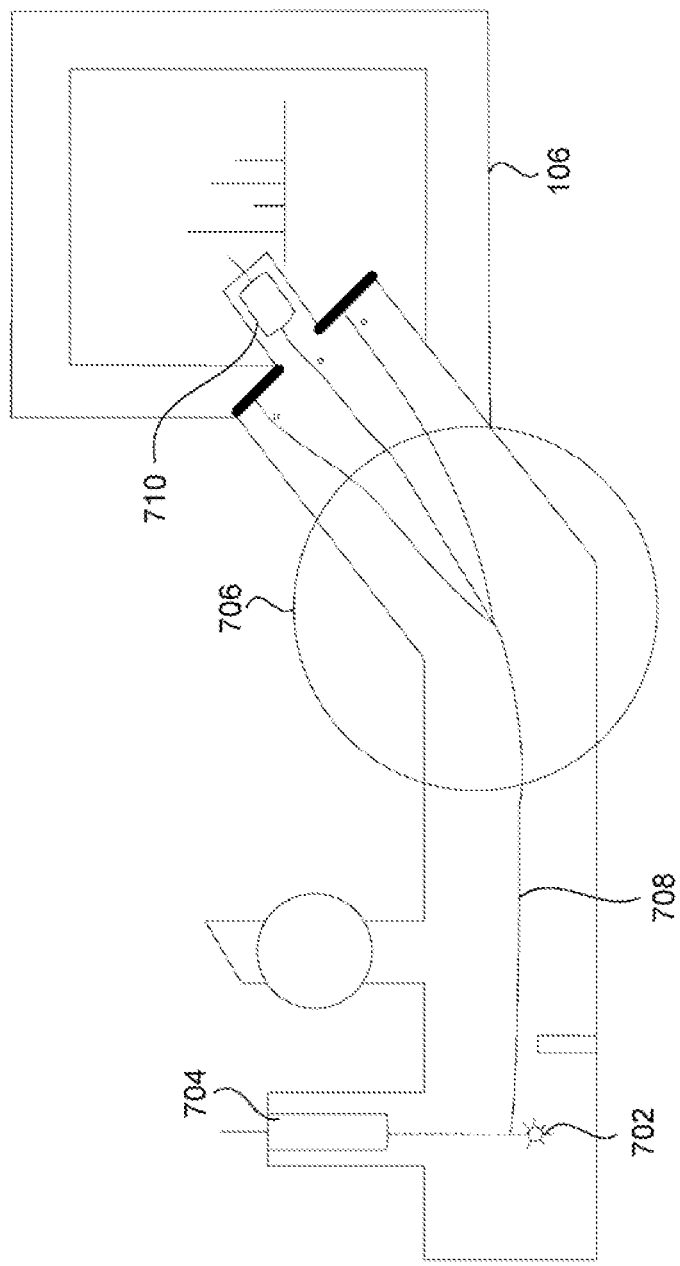

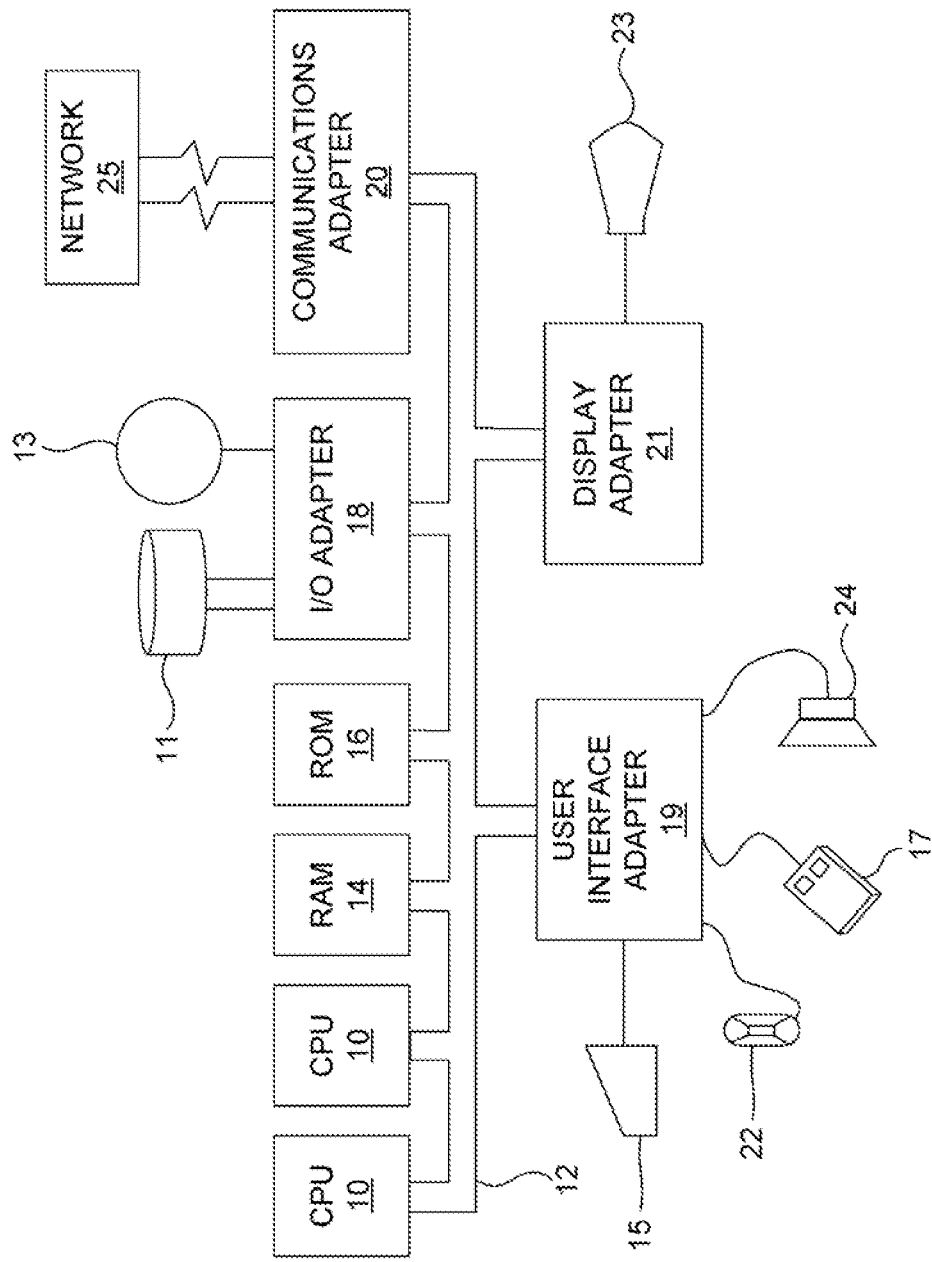

SYSTEM AND METHOD FOR ACCURATELY QUANTIFYING COMPOSITION OF A TARGET SAMPLE

TECHNICAL FIELD

The embodiments herein generally relate to quantifying a composition of a target sample, and, more particularly, to a system and a method for enhancing accuracy of quantifying a composition of a target sample.

BACKGROUND ART

Quantifying a composition of gas mixture that stored in a source (e.g. a tank or a pipe line etc.) is a challenging task. Quantifying a composition of gas mixture in a source may help to determine whether the composition of gas mixture exceeds a threshold level or not. Typically, the composition of gas mixture is quantified using a mass spectrometer. The mass spectrometer may produce a signature with each ion appearing exactly corresponding to its mass to charge ratio (i.e. m/z value). The mass spectrometer may also produce a signature with each one appearing exactly corresponding to its dimensionless integer values as a width impulse and a height corresponding to its molecular fraction. The mass spectrometer typically displays many non-idealities.

The mass spectrometer may ionize different gases at different relative rates. Ions of the different gases may be fragmented and may appear at various mass to charge ratios (i.e. m/zs). The fragmented ions at various mass to charge ratios are transmitted to a detector. The fragmentation of the ion may be constant for one gas. The fragmentation of the ions may be obtained from a standard reference database. Each peak of the fragmented ions typically includes a non-zero width, and possibly asymmetric shape which depends on the mass to charge ratio. The peak of the fragmented ions is varied between classes of instruments as the peak of the fragmented ions is specified based on the mass spectrometer. Noise may be added to the signature at various points in the quantification system due to unavoidable natural causes (e.g. coupling, shot noise, thermal noise, mechanical imperfections and vibrations).

One approach for addressing one or more non-idealities involves de-convoluting a convoluted spectrum based on the data obtained from a mass spectrometer. However, this approach fails to optimally remove the noise at output of the mass spectrometer and fails to remove random variations. In another approach, a theoretical isotropic mass spectrum is generated for each candidate in a set of candidate compositions. This approach fails to reduce estimation error while generating the isotropic mass spectrum. According to yet another approach, ratios of molecular peaks are used to overlap peaks. This however, fails to reduce an effective noise floor.

SUMMARY OF INVENTION

Accordingly, there remains a need for a system and a method for quantifying a composition of a target sample that addresses the above mentioned problems of noise, estimations errors and random variations, and provides increased accuracy.

One of aspect of this invention is a system for quantifying a composition of a target sample based on a scan output of a first type of sensor for the target sample. The scan output comprising spectra of detected ions as a function of the mass-to-charge ratio corresponding to the target sample. The system comprising a reference database, a custom database and a set of modules. The reference database stores standard reference datarelated to standard fragmentation and ionization potentials of the target sample. The custom database stores fragmentation information and ionization potentials of the target sample which are determined using the first type of sensor. The set of modules includes an analytical model creation module, a sample processing module, a molecular fraction estimation module, an analytical model optimization module, and a target composition estimation module.

The analytical model creation module is configured to create an analytical model of the first type of sensor using calibration data of the first type of sensor and the standard reference data. The analytical model is a mathematical model of the first type of sensor. The calibration data includes data related to the analytical model that is calibrated for the standard reference data. The sample processing module is configured to process a plurality of samples that comprise accurately known compositions using the first type of sensor under a standard pressure condition. The molecular fraction estimation module is configured to estimate molecular fraction of the plurality of samples using an estimation method and the analytical model of the first type of sensor. The analytical model optimization module is configured to optimize the analytical model of the first type of sensor by comparing the molecular fraction of the plurality of samples with a pre-determined molecular fraction of the plurality of samples. The target composition estimation module is configured to estimate a composition of the target sample based on the scan output of the target sample obtained from the first type of sensor using the estimation method with the optimized analytical model of the first type of sensor.

The system (target composition estimation system) may be used to quantify the composition of a target sample (e.g. gas mixture) and solve a reverse problem based on an output from a first type of sensor. The system may be used to prioritize different mass to charge ratios (e.g. m/z) to improve accuracy of the composition of the target sample. The system may be used to solve the reverse problem without explicitly enumerating all the gases. The system may be used to quantify the composition of the target sample simultaneously for all the gases. The system solves the reverse problem without explicitly deconvolving peaks. The correlations between the fragments of the target sample may be used to improve the quantitative accuracy for the target sample that includes low concentration and noise robustness. The system may be used to prioritize the target sample in the solution. The mass to charge ratios of the target sample are prioritized to improve accuracy of desired gases.

The analytical model optimization module may include a unit that is configured to optimize existing analytical model of the first type of sensor intermittently for increased accuracy by using the sample processing module for processing a plurality of samples and comparing the molecular fraction of the plurality of samples with a pre-determined molecular fraction of the plurality of samples intermittently. The analytical model optimization module may be configured to request an analytical model optimization server to optimize the analytical model of the first type of sensor.

The first type of sensor may include a unit for ionizing the target sample and a unit for sorting ions based on their mass to charge ratio. One of the first type of sensor is a spectroscopic type sensor. One of the first type of sensor is a mass spectrometer. The system may include the first type of sensor.

The molecular fraction estimation module may include a unit that is configured to estimate molecular fraction of the plurality of samples using a estimation method comprises a non-negative least squares estimation method. The analytical model optimization module may be configured to create the optimized analytical model of the first type of sensor using an optimization method any one of (a) linear least squares optimization technique, (b) non-linear least squares optimization technique or (c) machine learning techniques. The analytical model creation module may include (a) a fragmentation module that is configured to fragment spectral patterns of the target sample; (b) an ionization determination module that is configured to determine relative ionization potentials of the target sample; (c) a transmission determination module that is configured to calculate transmission efficiencies of the target sample at each mass to charge ratio; and (d) a peak shapes analysis module that is configured to spread a signal and analyze non-ideal peak shapes of the signal, wherein the low resolution effects in the signal are spread when the peaks of an ion are overlapped with peaks of another ion with different mass to charge ratio.

The analytical model of the first type of sensor may include (a) fragments spectral patterns of the target sample, (b) relative ionization potentials of the target sample, (c) transmission efficiencies of the target sample and (d) non-ideal peak shapes of a signal at the first type of sensor. The target sample may include a gas mixture, a liquid, a solid and a biological object.

The system may further include a memory that stores the reference database, the custom database and the set of modules and a processor that executes the set of modules.

Another aspect of this invention is a method that includes quantifying, that is performed by a system, a composition of a target sample based on a scan output of a first type of sensor for the target sample. The system comprises a reference database and a custom database. The quantifying includes following steps of:
(i) creating an analytical model of the first type of sensor using calibration data of the first type of sensor and the standard reference data, the analytical model being a mathematical model of the first type of sensor and the calibration data comprising data related to the analytical model that is calibrated for the standard reference data;
(ii) processing a plurality of samples that comprise accurately known compositions using the first type of sensor under a standard pressure condition;
(ii) estimating a molecular fraction of the plurality of samples using an estimation method and the analytical model of the first type of sensor;
(iv) optimizing the analytical model of the first type of sensor by comparing the molecular fraction of the plurality of samples with a pre-determined molecular fraction of the plurality of samples; and
(v) estimating a composition of the target sample based on the scan output of the target sample obtained from the first type of sensor using the estimation method with the optimized analytical model of the first type of sensor.

The step of optimizing may include optimizing existing analytical model of the first type of sensor intermittently for increased accuracy by using the processing a plurality of samples and comparing the molecular fraction of the plurality of samples with a pre-determined molecular fraction of the plurality of samples intermittently. The step of optimizing may include requesting an analytical model optimization server to optimize the analytical model of the first type of sensor.

The estimation method may include a non-negative least squares estimation method. The step of optimizing may include optimizing the analytical model of the first type of sensor using any one of (a) linear least squares optimization technique, (b) non-linear least squares optimization technique or (c) machine learning techniques.

The step of creating may include: (a) fragmenting spectral patterns of the target sample; (b) determining relative ionization potentials of the target sample; (c) calculating transmission efficiencies of the target sample at each mass to charge ratio; and (d) spreading a signal and analyzing non-ideal peak shapes of the signal, wherein the low resolution effects in the signal are spread when the peaks of an ion are overlapped with peaks of another ion with different mass to charge ratio.

Yet another aspect of this invention is computer program (program product) that includes instructions for a computer to operate as the system described above. The program (program product) may be supplied stored in a memory medium.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following detailed description with reference to the drawings, in which:

FIG. 1 illustrates a system for quantifying a composition of a source that includes a target sample using a first type of sensor according to an embodiment herein;

FIG. 2 illustrates an exploded view of a target composition estimation system of FIG. 1 according to an embodiment herein;

FIG. 3 is a flow diagram that illustrates a process for generating an optimized analytical model for the first type of sensor of FIG. 1 according to an embodiment herein;

FIG. 4 is a flow diagram that illustrates an estimation of a composition of a target sample based on a scan output of the target sample from a first type of sensor according to an embodiment herein;

FIG. 5 is a graphical representation that illustrates extraction of a peak from a noise at the first type of sensor of FIG. 1 according to an embodiment herein;

FIG. 6 is a flow diagram that illustrates a method for quantifying a composition of the target sample using the target composition estimation system of FIG. 1 according to an embodiment herein;

FIG. 7 illustrates a perspective view of a first type of sensor (a mass spectrometer) according to an embodiment herein; and FIG. 8 illustrates a schematic diagram of a computer architecture of a system in accordance with the embodiments herein.

DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved system and method for quantifying a composition of a target sample that addresses the above mentioned problems of noise, estimations errors and random variations, and provides increased accuracy. The embodiments herein achieve this by providing a target composition estimation system that creates an analytical model of a first type of sensor. The target composition estimation system further enhances the analytical model of the first type of sensor using linear or non-linear least squares optimization techniques and machine learning techniques. The target composition estimation system quantifies the composition of the target sample based on a scan output of the target sample from the first type of sensor using an estimation method with an optimized analytical model of the first type of sensor and a non-negative least squares estimation method. Referring now to the drawings, and more particularly to FIGS. 1 through 8, where similar reference characters denote corresponding features consistently throughout the figures, preferred embodiments are shown.

FIG. 1 illustrates a system for quantifying a composition of a source 102 that includes a target sample using a first type of sensor 104 according to an embodiment herein. The system of this invention may include the source 102, the first type of sensor 104 and a target composition estimation system 106. The system of this invention may include the first type of sensor 104 and the target composition estimation system 106. The system of this invention may include the target composition estimation system 106. The source 102 includes a target sample. In an embodiment, the target sample is a gas mixture, a liquid, a solid, a biological object and the like. The target composition estimation system 106 may be electrically connected to the first type of sensor 104. The first type of sensor 104 generates a scan output for the target sample. The scan output includes spectra of detected ions as a function of the mass-to-charge ratio corresponding to the target sample. In an embodiment, the first type of sensor 104 includes a mass spectrometer sensor and/or spectroscopic type sensors (e.g. a mass spectrometer, a Raman spectrometer, an absorption spectrometer or a vibrational spectrometer). In an embodiment, one example of the first type of sensor 104 is disclosed in the U.S. Pat. No. 9,666,422. The target composition estimation system 106 creates an analytical model of the first type of sensor 104 using calibration data (i.e. a measured data related to the analytical model are calibrated for standard reference data) of the first type of sensor 104 and standard reference data. The analytical model is a mathematical model of the first type of sensor 104 which (a) ionizes the target sample and (b) sorts ions based on their mass to charge ratio (m/z). For example, the analytical model of the first type of sensor 104 may include fragments patterns of the target sample, ionization potentials of the target sample, transmission efficiencies of the target sample and non-ideal peak shapes of a signal at the first type of sensor 104. The target composition estimation system 106 processes different samples (e.g. gas mixtures) that include accurately known compositions using the first type of sensor 104 under a standard pressure condition. The target composition estimation system 106 estimates molecular fraction of the different samples using an estimation method and the analytical model of the first type of sensor 104. The estimation method may include a non-negative least squares estimation method.

The target composition estimation system 106 further optimizes the analytical model of the first type of sensor 104 to obtain an optimized analytical model by comparing the molecular fraction of the different samples with a predetermined molecular fraction of the different samples using any one of (a) linear least squares optimization technique, (b) non-linear least squares optimization technique or (c) machine learning techniques. The target composition estimation system 106 further estimates the composition of the target sample based on the scan output of the target sample obtained from the first type of sensor 104 using the estimation method with the optimized analytical model of the first type of sensor 104 and an optimization method. In an embodiment, the optimization method is a non-negative least squares optimization method, a Gaussian-Newton optimization method, Levenberg-Marquardt optimization method or a Trust region reflective optimization technique. The target composition estimation system 106 may replace the analytical model with the enhanced analytical model. The target composition estimation system 106 may be a computer, a mobile phone, a PDA (Personal Digital Assistant), a tablet, an electronic notebook or a Smartphone. In an embodiment, the first type of sensor 104 is embedded in the target composition estimation system 106. The system view may further include an analytical model optimization server that communicates with the target composition estimation system 106. In an embodiment, the target composition estimation system 106 requests the analytical model optimization server intermittently to optimize the analytical model of the first type of sensor 104.

FIG. 2 illustrates an exploded view of the target composition estimation system 106 of FIG. 1 according to an embodiment herein. The exploded view of the system 106 includes a reference database 202, a custom database 204, an analytical model creation module 206, a sample processing module 208, a molecular fraction estimation module 210, an analytical model optimization module 212 and a target composition estimation module 214. The analytical model creation module 206 creates the analytical model of the first type of sensor 104. The analytical model creation module 206 includes a fragmentation module 206A, an ionization determination module 206B, a transmission determination module 206C and a peak shapes analysis module 206D. The reference database 202 stores data related to standard fragmentation and ionization potentials of a target sample (e.g. a mixture of gases). The custom database 204 stores fragmentation information and ionization potentials of the target sample which are determined using the first type of sensor 104. The fragmentation module 206A fragments spectral patterns of the target sample. The ionization determination module 206B determines relative ionization potentials of the target sample. The transmission determination module 206C calculates transmission efficiencies of the target sample at each mass to charge ratio (m/z). The peak shapes analysis module 206D spreads a signal (e.g. low resolution effects) and analyzes non-ideal peak shapes of the signal. In an embodiment, low resolution effects in the signal are spread when the peaks of an ion are overlapped with peaks of another ion with different mass to charge ratio (m/z).

The sample processing module 208 processes different samples that include accurately known compositions using the first type of sensor 104 under a standard pressure condition. The molecular fraction estimation module 210 estimates the molecular fraction of the different samples using an estimation method and the analytical model of the first type of sensor 104. In an embodiment, the estimation method includes a non-negative least squares estimation method. The analytical model optimization module 212 optimizes the analytical model of the first type of sensor 104 by comparing the molecular fraction of the different samples with a pre-determined molecular fraction of the different samples using any one of (a) linear least squares optimization technique, (b) non-linear least squares optimization technique or (c) machine learning techniques. The target composition estimation module 214 estimates a composition of the target sample based on a scan output of the target sample obtained from the first type of sensor 104 using the estimation method with the analytical model of the first type of sensor 104 and an optimization method. The exploded view of the target composition estimation system 106 further includes an analytical model replacement module 216. The analytical model replacement module 216 replaces the analytical model to the optimized analytical model.

In an embodiment, the analytical model optimization module 212 may request the analytical model optimization server to optimize the analytical model of the first type of sensor 104. The analytical model optimization server is communicated with the target composition estimation system 106 intermittently. The analytical model optimization server may optimize the analytical model of the first type of sensor 104 by comparing the molecular fraction of the different samples with a pre-determined molecular fraction of the different samples using any one of (a) least squares optimization technique, (b) non-linear least squares optimization technique or (c) machine learning techniques.

In an embodiment, matrices representing various model components are generated. A set of samples with "g" gases and a scan output of the first type of sensor 104 involving 's' distinct mass to charge ratio points corresponding to 'm' distinct integral values are analyzed. The matrices are as per the table below.

TABLE 1

| Matrix | Description | Obtained by | size: (rows × columns) |
| --- | --- | --- | --- |
| Y | Measured spectrum | Measurement | s × 1 |
| P | Convolution matrix (representing peak shapes) | Calibration and analytic shape fitting | s × m |
| T | Transmission efficiencies at each integral mass to charge ratio (m/z) | calibration | T: m × 1 diag(T): m × m |
| R | Relative ionization potentials for each gas | Reference data | R: g × 1 diag(R): g × g |
| C | Reference spectrum (representing the idealized responses for each gas at each integral mass to charge ratio (m/z) value) | Reference data, calibration | m × g |
| M | Gas molecular fractions (unit normalized) | Estimation method output | g × 1 |

The target composition estimation system 106 detects a composition of the target sample using the matrices that can be represented as $$Y = P \times \mathrm{diag}(T) \times C \times \mathrm{diag}(R) \times X \qquad [\text{Math. 1}]$$

where X is a least squares solution.

FIG. 3 is a flow diagram that illustrates a process for generating an optimized analytical model for the first type of sensor 104 of FIG. 1 for improving accuracy using standard machine learning techniques according to an embodiment herein. At step 302, the analytical model of the first type of sensor 104 is created using calibration data (e.g. standard characterization data) 301 of the first type of sensor 104 and standard reference data 202. A known composition of different samples is processed using the first type of sensor 104 under a predetermined condition or a standard pressure condition (e.g. the known composition of the different samples are processed under a controlled pressure condition when the first type of sensor 104 is the mass spectrometer used). The molecular fractions (e.g. an estimated output) of the different samples are estimated using an estimation method with the analytical model of the first type of sensor 104. In an embodiment, the estimation method includes a non-negative least squares estimation method. The estimated molecular fractions may be compared with the standard outputs to optimize the analytical model of the first type of sensor 104 using any one of (a) linear least squares optimization technique, (b) non-linear least squares optimization technique or (c) machine learning techniques at step 303. In an embodiment, the optimization of the analytical model 304 of the first type of sensor 104 leads to a 'B' matrix, or matrices (P—convolution matrix representing peak shapes, T—Transmission efficiencies at each integral mass to charge ratio (m/z), R—relative ionization potentials for each gas, C—reference spectrum representing idealized responses for each gas at the integral m/z value). The matrix 'B', or P, T, C, R matrices are perturbed from original values to a set of values that optimally represent a scan output of the known compositions of the different samples. In an embodiment, the matrix 'B' (e.g. a whole matrix that includes P, C, T and R matrices) is optimized using the linear optimization method (e.g. the non negative least squares optimization method). In an embodiment, an individual matrix (e.g. any one of the matrix among the matrices P, C, T and R) is optimized by a non-linear optimization method that uses a non-linear optimizer (e.g. a constrained version of Gauss-Newton, Levenberg-Marquardt optimization method or Trust region reflective optimization method).

FIG. 4 is a flow diagram that illustrates an estimation of a composition of a target sample based on a scan output of the target sample from a first type of sensor 104 according to an embodiment herein. At step 402, the scan output of the target sample from the first type of sensor 104 is obtained. At step 404, the analytical model of the first type of sensor 104 is created using calibration data of the first type of sensor 104 and standard reference data. At step 406, the composition of the target sample is estimated based on the scan output of the target sample from the first type of sensor 104 using an estimation method 405 with the analytical model of the first type of sensor 104 and a non-negative least squares optimization method.

The least squares solution is defined as $X = \mathrm{argmin}(\|Y' - Y(X)\|_2)$ such that $X_i > 0$ for all i. The linear algebra techniques of ordinary least squares (OLS) regression provides a least squares solution with negative values. The non-negative least squares estimation method may be used to find a non-negative optimal solution (NNLS). An estimated least squares solution is calculated as Xest=NNLS(B, Y'), where (Y') is the scan that includes noise from the first type of sensor 104. In an embodiment, the non-negative least squares estimation method is defined as follows:

Inputs:
[Math. 2]
   a real-valued matrix A of dimension m×n
   a real-valued vector y of dimension in
   a real value t, the tolerance for the stopping criterion Initialize:
[Math. 3]
   Set P=
   Set R={1 . . . , n}
   Set x to an all-zero vector of dimension n
   Set w=A (y−Ax)

Main loop: while R≠ and max(w)>t,
[Math. 4]
   Let j be the index of max(w) in w
   Add j to P
   Remove j from R
   Let $A^P$ be A restricted to the variables included in P
   Let $S^P = ((A^P)\, A^P)^{-1}\, (A^P)\, y$
   While min($S^P$)≤0:
     Let $\alpha = \min(x_i/x_i - s_i)$ for i in P where $s_i \leq 0$
     Set x to x+α(s−x)
     Move to R all indices j in P such that $x_j=0$
     Set $s^P = ((A^P)\, A^P)^{-1}\, (A^P)\, y$
     Set $s^R$ to zero
   Set x to s
   Set w to A (y−Ax)

The estimation method may suppress random noise optimally using a least squares optimality. In an embodiment, the matrices (Y—measured spectrum, P—convolution matrix representing peak shapes, T—Transmission efficiencies at each integral mass to charge ratio (m/z), R—relative ionization potentials for each gas, C—reference spectrum representing idealized responses for each gas at the integral m/z value and M—gas molecular fractions) are inputs to the non-negative least squares estimation method to correlate information with the matrices to estimate a composition of the target sample.

FIG. 5 is a graphical representation that illustrates extraction of a peak from a noise at the first type of sensor 104 of FIG. 1 according to an embodiment herein. The graph shows an extraction of peak shapes of the signal from noise. The graphical representation shows a dotted line 502 (e.g. an output of an analytical model of a first type of sensor 104) that indicates separation of peaks that are hidden in noise by correlating with other peaks. In an embodiment, a line 504 indicates vector 'y', and the dotted line 502 indicates '$Y_{xh}$'. The 'xh' may indicate an output of an estimation method.

FIG. 6 is a flow diagram that illustrates a method for quantifying a composition of a target sample (e.g. gas mixture) using the target composition estimation system 106 of FIG. 1 according to an embodiment herein. At step 602, an analytical model of a first type of sensor 104 is created using calibration data of the first type of sensor 104 and standard reference data. In an embodiment, the analytical model of the first type of sensor 104 may be created based on information related to the target sample that is fragmented and relative ionization potentials of the target sample that is determined using the first type of sensor 104. At step 604, different samples that include accurately known compositions are processed using the first type of sensor 104 under a predetermined condition or a standard pressure condition. At step 606, molecular fraction of the different samples is estimated using an estimation method and the analytical model of the first type of sensor 104. In an embodiment, the estimation method includes a non-negative least squares estimation method. At step 608, the analytical model of the first type of sensor 104 is optimized by comparing the molecular fraction of the different samples with a pre-determined molecular fraction of the different samples (e.g. an expected molecular fraction of the different samples) using any one of (a) linear least squares optimization technique, (b) non-linear least squares optimization technique or (c) machine learning techniques. At step 610, the composition of the target sample is estimated based on the scan output of the target sample obtained from the first type of sensor 104 using the estimation method with the analytical model of the first type of sensor 104 and an optimization method. In an embodiment, the optimization method is a non-negative least squares optimization method, a Gaussian-Newton optimization method, Levenberg-Marquardt optimization method or a Trust region reflective optimization technique. The non negative least squares optimization method may be processed based on the matrices (Y—measured spectrum, P—convolution matrix representing peak shapes, T—Transmission efficiencies at each integral mass to charge ratio (m/z), R—relative ionization potentials for each gas, C—reference spectrum representing idealized responses for each gas at the integral m/z value and M—gas molecular fractions).

EXAMPLES

The target composition estimation system 106 obtains a scan output of three gas samples at a range from 1 mass to charge ratio (m/z) to 10 m/z with a resolution of 0.5 m/z (i.e. s=20 and m=10) to quantify a composition of the gas samples. For example, the three gas samples (e.g. g=3) are considered with the following relative fragmentation pattern.

[Math. 5]

Gas 1 (G1): 50% at 4 m/z, 25% at 2 m/z and 25% at 1 m/z

Gas 2 (G2): 20% at 8 m/z, 60% at 4 m/z and 20% at 2 m/z

Gas 3 (G3): 15% at 10 m/z, 70% at 6 m/z and 15% at 4 m/z

The C matrix (i.e. reference spectrum representing idealized responses for each gas at each m/z value) corresponding to the fragmentation pattern is given as $$C = \begin{pmatrix} .25 & 0 & 0 \\ .25 & 0.2 & 0 \\ 0 & 0 & 0 \\ .5 & .6 & .15 \\ 0 & 0 & 0 \\ 0 & 0 & 0.7 \\ 0 & 0 & 0 \\ 0 & 0.2 & 0 \\ 0 & 0 & 0 \\ 0 & 0 & 0.15 \end{pmatrix}$$ [Math. 6]

In an embodiment, an overlap of fragmentation pattern of the three gas samples at the same mass to charge ratio are identified. The matrix R (i.e. relative ionization potentials of the three gas samples) is considered to be 1, 1.5 and 2 respectively, leading to $$\mathrm{diag}(R) = \begin{pmatrix} 1 & 0 & 0 \\ 0 & 1.5 & 0 \\ 0 & 0 & 1.2 \end{pmatrix} \quad [\text{Math. 7}]$$

The transmission efficiencies (T) for the three gas samples at each mass to charge ratio are assumed as $$T = [\, 1\ 1\ 1\ 1.2\ 1\ 1.2\ 1.1\ 1.1\ 1.1\ 1.1\, ] \quad [\text{Math. 8}]$$

A simple constant-width peak model is used to spread the mass to charge ratio peak for each of the three gas samples into two adjacent non-integral mass to charge ratios. The matrix P is given as $$P = \begin{pmatrix} 0.5 & 0 & 0 & \ldots \\ 1 & 0 & 0 & \ldots \\ 0.5 & 0.5 & 0 & \ldots \\ 0 & 1 & 0 & \ldots \\ 0 & 0.5 & 0.5 & \ldots \\ 0 & 0 & 1 & \ldots \\ 0 & 0 & 0.5 & \ldots \end{pmatrix} \quad [\text{Math. 9}]$$

An analytical model may be provided by the matrix 'B', where $$B = P \times \mathrm{diag}(T) \times C \times \mathrm{diag}(R) \quad [\text{Math. 10}]$$

In an example embodiment, an expected scan output/vector (y) for a hypothetical gas composition of 20% of g1, 50% of g2 and 30% of g3 is $$y = \begin{pmatrix} 0.025 \\ 0.05 \\ 0.125 \\ 0.2 \\ 0.1 \\ 0.0 \\ 0.3624 \\ 0.7248 \\ 0.3624 \\ 0.0 \\ 0.1512 \\ 0.3024 \\ 0.1512 \\ 0.0 \\ 0.0825 \\ 0.165 \\ 0.0825 \\ 0.0 \\ 0.0297 \\ 0.0594 \\ 0.0297 \end{pmatrix} \quad [\text{Math. 11}]$$

The substantial random noise (e.g. ~20% of smallest signal peak height) is added to a noise of the target composition estimation system 106 (i.e. a noise presented in the system is simulated by adding the random noise) to obtain an adjusted scan output/vector (yn) as follows:

$$yn = \begin{pmatrix} 0.0284836820388 \\ 0.0583408994026 \\ 0.133334599344 \\ 0.200676507515 \\ 0.101356489355 \\ 0.00938563262842 \\ 0.371971391843 \\ 0.733934957823 \\ 0.37169907939 \\ 0.000118313086739 \\ 0.160643738196 \\ 0.303053302696 \\ 0.15335056561 \\ 0.00137249127025 \\ 0.0906195118128 \\ 0.1722020233997 \\ 0.0902533476839 \\ 1.49655017994e-05 \\ 0.0363344437321 \\ 0.0594637294578 \\ 0.029786529528 \end{pmatrix} \quad [\text{Math. 12}]$$

The adjusted scan output is processed using the estimation method with the above analytical model to provide molecular fractions of the hypothetical gas (e.g. 3% error in computing molecular fractions for 20% added noise) as given below.

$$xh = [\, 0.20582101,\ 0.49635623\ \ 0.29782277\, ] \quad [\text{Math. 13}]$$

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 7 illustrates a perspective view of a first type of sensor 104 (a mass spectrometer) according to an embodiment herein. The first type of sensor 104 includes a target sample 702, an electron gun 704, an electric magnet 706, an ion beam 708 and an ion detector 710. The target sample 702 to be ionized is obtained from the source 102. The electron gun 704 ionizes particles in the target sample 702 by adding or removing electrons from the ionized particles. The electron gun 704 ionizes vaporized or gaseous particles using electron ionization process. The electric magnet 706 in the first type of sensor 104 produces electric or magnetic fields to measure the mass (i.e. weight) of charged particles. The magnetic field separates the ions according to their momentum (i.e. how the force exerted by the magnetic field can be used to separate ions according to their mass). The separated ion is targeted through a mass analyzer and onto the ion detector 710. In an embodiment, differences in masses of the fragments allow the mass analyzer to sort the ions using their mass-to-charge ratio. The ion detector 710 measures a value of an indicator quantity and thus provides data for calculating the abundances of each ion present in the target sample 702. The ion detector 710 records either the charge induced or the current produced when the ion passes by or hits a surface. In an embodiment, the mass spectrum is displayed in the target composition estimation system 106.

A representative hardware environment for practicing the embodiments herein is depicted in FIG. 8. This schematic drawing illustrates a hardware configuration of the target composition estimation system 106 in accordance with the embodiments herein. The target composition estimation system 106 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The target composition estimation system 106 can read the inventive instructions on the program storage devices and follow these instructions to execute the methodology of the embodiments herein.

The target composition estimation system 106 further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

One of the aspects of the above is a computer implemented method for quantifying a composition of a target sample 702 using a target composition estimation system 106 including a first type of sensor 104. The method includes following steps of: (a) creating 602, using an analytical model creation module 206, an analytical model of the first type of sensor 104 using calibration data of the first type of sensor 104 and standard reference data; (b) processing 604, using a sample processing module 208, a plurality of samples that comprise accurately known compositions using the first type of sensor 104 under a standard pressure condition; (c) estimating 606, using a molecular fraction estimation module 210, a molecular fraction of the plurality of samples using an estimation method and the analytical model of the first type of sensor 104; (d) optimizing 608, using an analytical model optimization module 212, the analytical model of the first type of sensor 104 by comparing the molecular fraction of the plurality of samples with a pre-determined molecular fraction of the plurality of samples using any one of (i) linear least squares optimization technique, (ii) non-linear least squares optimization technique or (iii) machine learning techniques; and (e) estimating 610, using a target composition estimation module 214, a composition of the target sample 702 based on a scan output of the target sample 702 obtained from the first type of sensor 104 using the estimation method with the analytical model of the first type of sensor 104 and an optimization method, wherein the scan output comprises spectra of detected ions as a function of the mass-to-charge ratio corresponding to the target sample 702. The analytical model is a mathematical model of the first type of sensor 104 which (a) ionizes the target sample 702 and (b) sorts ions based on their mass to charge ratio (m/z). The calibration data comprises data related to the analytical model that is calibrated for the standard reference data. The estimation method comprises a non-negative least squares estimation method.

The step of creating the analytical model of the first type of sensor 104 includes steps of: (a) fragmenting, using a fragmentation module 206A, spectral patterns of the target sample 702; (b) determining, using an ionization determination module 206B, relative ionization potentials of the target sample 702; (c) calculating, using a transmission determination module 206C, transmission efficiencies of the target sample 702 at each mass to charge ratio (m/z); and (d) spreading, using a peak shapes analysis module 206D, a signal and analyzing non-ideal peak shapes of the signal, wherein the low resolution effects in the signal are spread when the peaks of an ion are overlapped with peaks of another ion with different mass to charge ratio (m/z).

Another aspect of the above is a system for quantifying a composition of a target sample 702. The system includes a first type of sensor 104 a target composition estimation system 106. The first type sensor 104 generates a scan output for the target sample 702. The scan output comprises spectra of detected ions as a function of the mass-to-charge ratio corresponding to the target sample 702. The target composition estimation system 106 that is connected to the first type of sensor 104. The target composition estimation system 106 includes a memory that stores a reference database 202, a custom database 204 and a set of modules, and a specialized target composition estimation processor that executes the set of modules. The reference database 202 stores data related to standard fragmentation and ionization potentials of the target sample 702. The custom database 204 stores fragmentation information and ionization potentials of the target sample 702 which are determined using the first type of sensor 104. The set of modules comprise: (a) an analytical model creation module 206 that is configured to create an analytical model of the first type of sensor 104 using calibration data of the first type of sensor 104 and standard reference data, wherein the analytical model is a mathematical model of the first type of sensor 104; (b) a sample processing module 208 that is configured to process a plurality of samples that comprise accurately known compositions using the first type of sensor 104 under a standard pressure condition; (c) a molecular fraction estimation module 210 that is configured to estimate molecular fraction of the plurality of samples using an estimation method and the analytical model of the first type of sensor 104, wherein the estimation method comprises a non-negative least squares estimation method; (d) an analytical model optimization module 212 that is configured to optimize the analytical model of the first type of sensor 104 by comparing the molecular fraction of the plurality of samples with a pre-determined molecular fraction of the plurality of samples using any one of (i) linear least squares optimization technique, (ii) non-linear least squares optimization technique or (iii) machine learning techniques; and (e) a target composition estimation module 214 that is configured to estimate a composition of the target sample 702 based on the scan output of the target sample 702 obtained from the first type of sensor 104 using the estimation method with the optimized analytical model of the first type of sensor 104 and an optimization method.

The first type of sensor 104 may include a spectroscopic type sensor. The first type of sensor 104 may include a mass spectrometer. The analytical model creation module 206 may comprise: (a) a fragmentation module 206A that is configured to fragment spectral patterns of the target sample 702; (b) an ionization determination module 206B that is configured to determine relative ionization potentials of the target sample 702; (c) a transmission determination module 206C that is configured to calculate transmission efficiencies of the target sample 702 at each mass to charge ratio (m/z); and (d) a peak shapes analysis module 206D that is configured to spread a signal and analyze non-ideal peak shapes of the signal, wherein the low resolution effects in the signal are spread when the peaks of an ion are overlapped with peaks of another ion with different mass to charge ratio (m/z).

Yet another aspect of the above is a system for quantifying a composition of a target sample 702. The system includes a first type of sensor 104 that generates a scan output for the target sample 702 and a target composition estimation system 106 that is connected to the first type of sensor 104. The target composition estimation system 106 includes a memory that stores the reference database 202, the custom database 204 and a set of modules, and a specialized target composition estimation processor that executes the set of modules. The set of modules includes (a) a target composition estimation module 214 that is configured to estimate a composition of the target sample 702 based on the scan output of the target sample 702 obtained from the first type of sensor 104 using an estimation method with an analytical model of the first type of sensor 104 and a non-negative least squares estimation method; and (b) an analytical model optimization module 212 that is configured to optimize the analytical model intermittently for increased accuracy by (i) creating 602, using an analytical model creation module 206, the analytical model of the first type of sensor 104 using calibration data of the first type of sensor 104 and standard reference data, wherein the analytical model is a mathematical model of the first type of sensor 104; (ii) processing 604, using a sample processing module 208, a plurality of samples that comprise accurately known compositions using the first type of sensor 104 under a standard pressure condition; (iii) estimating 606, using a molecular fraction estimation module 210, molecular fraction of the plurality of samples using the estimation method and an existing analytical model of the first type of sensor 104; (iv) optimizing 608, using an analytical model optimization module 212, the existing analytical model of the first type of sensor 104 by comparing the molecular fraction of the plurality of samples with a pre-determined molecular fraction of the plurality of samples using any one of optimization techniques; and (v) replacing, using an analytical model replacement module 216, the existing analytical model to an optimized analytical model.

Yet another aspect of the above is a system for quantifying a composition of a target sample 702 based on an analytical model optimization server. The system includes a first type of sensor 104 and a target composition estimation system that is connected to the first type of sensor 104. The target composition estimation system 106 includes a memory that stores a reference database 202, a custom database 204 and a set of modules, and a specialized target composition estimation processor that executes the set of modules. The set of modules includes (a) an analytical model creation module 206 that is configured to create an analytical model of the first type of sensor 104 using calibration data of the first type of sensor 104 and standard reference data, wherein the analytical model is a mathematical model of the first type of sensor 104; (b) a sample processing module 208 that is configured to process a plurality of samples that comprise accurately known compositions using the first type of sensor 104 under a standard pressure condition; (c) a molecular fraction estimation module 210 that is configured to estimate molecular fraction of the plurality of samples using an estimation method and the analytical model of the first type of sensor 104; (d) an analytical model optimization module 212 that is configured to request the analytical model optimization server to optimize the analytical model of the first type of sensor 104; and (e) a target composition estimation module 214 that is configured to estimate a composition of a target sample 702 based on the scan output of the target sample 702 obtained from the first type of sensor 104 using the estimation method with the optimized analytical model of the first type of sensor 104 and an optimization method. The optimization method is a non-negative least squares optimization method. The analytical model optimization server is communicated with the specialized target composition estimation processor intermittently. The analytical model optimization server optimizes the analytical model of the first type of sensor 104 by comparing the molecular fraction of the plurality of samples with a pre-determined molecular fraction of the plurality of samples using any one of (a) least squares optimization technique, (b) non-linear least squares optimization technique or (c) machine learning techniques.

The analytical model of the first type of sensor 104 may include (a) fragments spectral patterns of the target sample 702, (b) relative ionization potentials of the target sample 702, (c) transmission efficiencies of the target sample 702 and (d) non-ideal peak shapes of a signal at the first type of sensor 104. The target sample 702 may include a gas mixture, a liquid, a solid and a biological object.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system for quantifying a composition of a target sample based on a scan output of a first type of sensor for the target sample, the scan output comprising spectra of detected ions as a function of the mass-to-charge ratio corresponding to the target sample, the system comprising:
   a reference database for storing standard reference data related to standard fragmentation and ionization potentials of the target sample;
   a custom database for storing fragmentation information and ionization potentials of the target sample which are determined using the first type of sensor; and
   a set of modules, wherein the set of modules comprises:
   an analytical model creation module that is configured to create an analytical model of the first type of sensor using calibration data of the first type of sensor and the standard reference data, the analytical model being a mathematical model of the first type of sensor and the calibration data comprising data related to the analytical model that is calibrated for the standard reference data;
   a sample processing module that is configured to process a plurality of samples that comprise accurately known compositions using the first type of sensor under a standard pressure condition;
   a molecular fraction estimation module that is configured to estimate molecular fraction of the plurality of samples using an estimation method and the analytical model of the first type of sensor;
   an analytical model optimization module that is configured to optimize the analytical model of the first type of sensor by comparing the molecular fraction of the plurality of samples with a pre-determined molecular fraction of the plurality of samples; and
   a target composition estimation module that is configured to estimate a composition of the target sample based on the scan output of the target sample obtained from the first type of sensor using the estimation method with the optimized analytical model of the first type of sensor;
   wherein the analytical model creation module comprises:
   a fragmentation module that is configured to fragment spectral patterns of the target sample;
   an ionization determination module that is configured to determine relative ionization potentials of the target sample;
   a transmission determination module that is configured to calculate transmission efficiencies of the target sample at each mass to charge ratio; and
   a peak shapes analysis module that is configured to spread a signal and analyze non-ideal peak shapes of the signal, wherein the low resolution effects in the signal are spread when the peaks of an ion are overlapped with peaks of another ion with different mass to charge ratio.

2. The system according to claim 1, wherein the analytical model optimization module includes a unit that is configured to optimize existing analytical model of the first type of sensor intermittently for increased accuracy by using the sample processing module for processing a plurality of samples and comparing the molecular fraction of the plurality of samples with a pre-determined molecular fraction of the plurality of samples intermittently.

3. The system according to claim 1, wherein the analytical model optimization module is configured to request an analytical model optimization server to optimize the analytical model of the first type of sensor.

4. The system according to claim 1, wherein the first type of sensor includes a unit for ionizing the target sample and a unit for sorting ions based on their mass to charge ratio.

5. The system according to claim 1, wherein the first type of sensor comprises a spectroscopic type sensor.

6. The system according to claim 1, wherein the first type of sensor comprises a mass spectrometer.

7. The system according to claim 1, the system includes the first type of sensor.

8. The system according to claim 1, wherein the molecular fraction estimation module includes a unit that is configured to estimate molecular fraction of the plurality of samples using a estimation method comprises a non-negative least squares estimation method.

9. The system according to claim 1, wherein the analytical model optimization module is configured to create the optimized analytical model of the first type of sensor using an optimization method any one of (a) linear least squares optimization technique, (b) non-linear least squares optimization technique or (c) machine learning techniques.

10. The system according to claim 1, wherein the target sample comprises a gas mixture, a liquid, a solid and a biological object.

11. The system according to claim 1, further comprising:
   a memory that stores the reference database, the custom database and the set of modules; and
   a processor that executes the set of modules.

12. A nontransitory computer readable medium encoded with a computer program including instructions for a computer to operate as the system according to claim 1.

13. A method including quantifying, that is performed by a system, a composition of a target sample based on a scan output of a first type of sensor for the target sample, the scan output comprising spectra of detected ions as a function of the mass-to-charge ratio corresponding to the target sample, wherein the system includes a reference database and a custom database, the reference database storing standard reference data related to standard fragmentation and ionization potentials of the target sample, and the custom database storing fragmentation information and ionization potentials of the target sample which are determined using the first type of sensor, and wherein the quantifying comprises:
creating an analytical model of the first type of sensor using calibration data of the first type of sensor and the standard reference data, the analytical model being a mathematical model of the first type of sensor and the calibration data comprising data related to the analytical model that is calibrated for the standard reference data;
processing a plurality of samples that comprise accurately known compositions using the first type of sensor under a standard pressure condition;
estimating a molecular fraction of the plurality of samples using an estimation method and the analytical model of the first type of sensor;
optimizing the analytical model of the first type of sensor by comparing the molecular fraction of the plurality of samples with a pre-determined molecular fraction of the plurality of samples; and
estimating a composition of the target sample based on the scan output of the target sample obtained from the first type of sensor using the estimation method with the optimized analytical model of the first type of sensor;
wherein the creating comprises:
fragmenting spectral patterns of the target sample;
determining relative ionization potentials of the target sample;
calculating transmission efficiencies of the target sample at each mass to charge ratio; and
spreading a signal and analyzing non-ideal peak shapes of the signal, wherein the low resolution effects in the signal are spread when the peaks of an ion are overlapped with peaks of another ion with different mass to charge ratio.

14. The method according to claim 13, wherein the optimizing includes optimizing existing analytical model of the first type of sensor intermittently for increased accuracy by using the processing and comparing the molecular fraction of the plurality of samples with a pre-determined molecular fraction of the plurality of samples intermittently.

15. The method according to claim 13, wherein the optimizing includes requesting an analytical model optimization server to optimize the analytical model of the first type of sensor.

16. The method according to claim 13, wherein the estimation method includes a non-negative least squares estimation method.

17. The method according to claim 13, wherein the optimizing includes optimizing the analytical model of the first type of sensor using any one of (a) linear least squares optimization technique, (b) non-linear least squares optimization technique or (c) machine learning techniques.

18. A system for quantifying a composition of a target sample based on a scan output of a first type of sensor for the target sample, the scan output comprising spectra of detected ions as a function of the mass-to-charge ratio corresponding to the target sample, the system comprising:
a reference database for storing standard reference data related to standard fragmentation and ionization potentials of the target sample;
a custom database for storing fragmentation information and ionization potentials of the target sample which are determined using the first type of sensor; and
a set of modules, wherein the set of modules comprises:
an analytical model creation module that is configured to create an analytical model of the first type of sensor using calibration data of the first type of sensor and the standard reference data, the analytical model being a mathematical model of the first type of sensor and the calibration data comprising data related to the analytical model that is calibrated for the standard reference data;
a sample processing module that is configured to process a plurality of samples that comprise accurately known compositions using the first type of sensor under a standard pressure condition;
a molecular fraction estimation module that is configured to estimate molecular fraction of the plurality of samples using an estimation method and the analytical model of the first type of sensor;
an analytical model optimization module that is configured to optimize the analytical model of the first type of sensor by comparing the molecular fraction of the plurality of samples with a pre-determined molecular fraction of the plurality of samples; and
a target composition estimation module that is configured to estimate a composition of the target sample based on the scan output of the target sample obtained from the first type of sensor using the estimation method with the optimized analytical model of the first type of sensor;
wherein the analytical model of the first type of sensor comprises (a) fragments spectral patterns of the target sample, (b) relative ionization potentials of the target sample, (c) transmission efficiencies of the target sample and (d) non-ideal peak shapes of a signal at the first type of sensor.

19. The system according to claim 18, wherein the analytical model optimization module is configured to create the optimized analytical model of the first type of sensor using an optimization method any one of (a) linear least squares optimization technique, (b) non-linear least squares optimization technique or (c) machine learning techniques.

20. The system according to claim 18, wherein the target sample comprises at least one of a gas mixture, a liquid, a solid, and a biological object.

21. The system according to claim 18, further comprising:
a memory that stores the reference database, the custom database and the set of modules; and
a processor that executes the set of modules.

22. A nontransitory computer readable medium encoded with a program product including instructions for a computer to operate the system according to claim 18.

* * * * *